Dec. 10, 1940.      A. D. SIEDLE      2,224,201
ABSORPTION REFRIGERATING SYSTEM
Filed Aug. 8, 1936
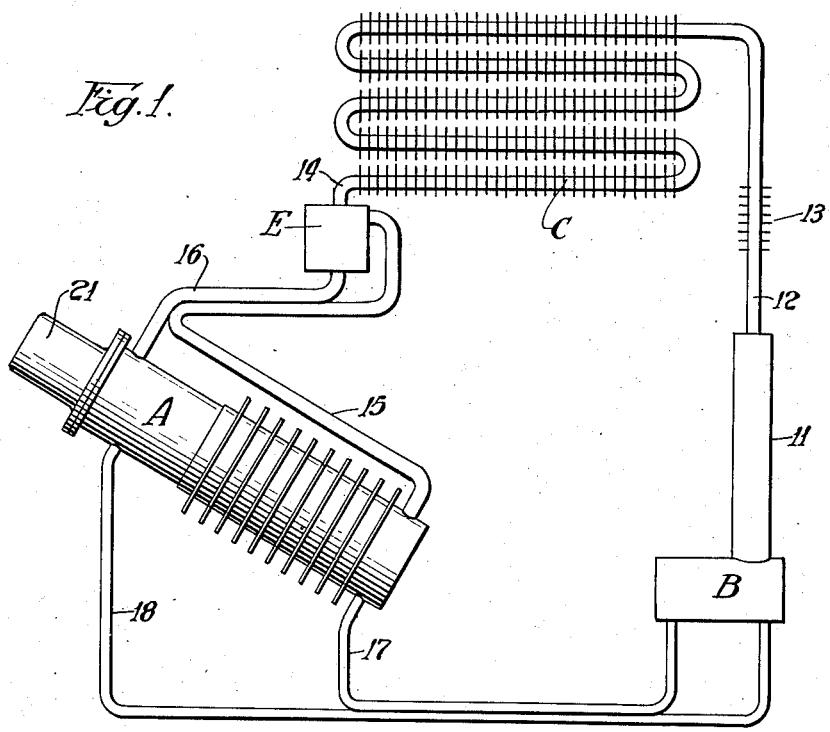
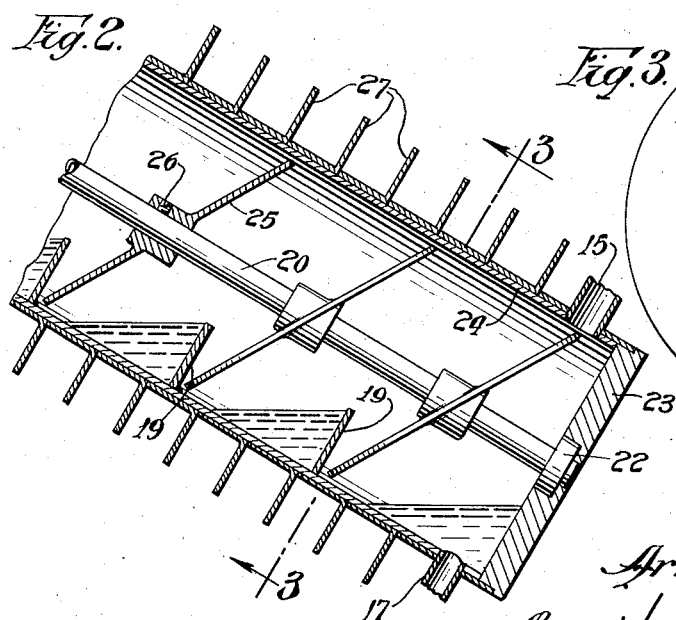
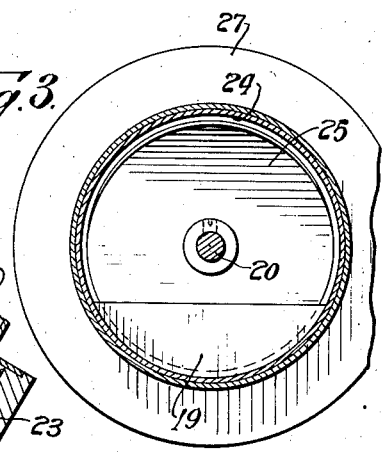
Inventor:
Arnold D. Siedle,
By: Harry S. Demarest
Attorney.
Witness:
E. Camporini Patented Dec. 10, 1940

2,224,201

UNITED STATES PATENT OFFICE 2,224,201

ABSORPTION REFRIGERATING SYSTEM

Arnold D. Siedle, Canton, Ohio, assignor to The Hoover Company, North Canton, Ohio, a corporation of Ohio Application August 8, 1936, Serial No. 94,938

6 Claims. (Cl. 62—119.5)

This invention relates to continuous absorption refrigerating systems of the type in which an inert gas is employed and more particularly to absorbers adapted for use in such systems and to means for circulating liquid therein.

In the co-pending application of Rudolph S. Nelson, Serial No. 45,528, filed October 18, 1935, patent No. 2,156,953, May 2, 1939, a mechanical absorber is disclosed in which a fan and a liquid pump are hermetically sealed within the absorber and are driven by an electric motor which is also hermetically sealed within the system.

It is an object of the present invention to provide improved means for circulating the liquid in an absorber of the type disclosed in the co-pending application to Nelson, mentioned above, and in which improved means is provided for bringing the absorption liquid and the inert gas and refrigeration gas in the system into intimate contact.

It is another object of the invention to provide an absorber for a refrigerating system with novel power driven means for circulating liquid therein, the arrangement being suitable for use in a construction in which the liquid circulating means is hermetically sealed within the system.

It is still another object of the invention to cause liquid to flow upwardly through a vessel by means of rotary members which may be hermetically sealed within the vessel.

Other objects reside in certain novel features of the arrangement and construction of parts as will be apparent from the following description taken in connection with the accompanying drawing in which:

Figure 1 is a diagrammatic representation of a continuous absorption refrigerating system with an absorber incorporated therein, the absorber being constructed in accordance with the present invention.

Figure 2 is a vertical cross-sectional view of the lower portion of the absorber shown in Fig. 1 the view being somewhat enlarged and Figure 3 is a transverse cross-sectional view of the absorber taken on the line 3—3 of Figure 2.

Referring to the drawing in detail and first to the diagram of Figure 1 it will be seen that a continuous absorption refrigerating system is illustrated as consisting of a boiler B, a condenser C, an evaporator E, an absorber A, these parts being connected by various conduits to form a complete, hermetically sealed refrigerating system.

The boiler B may consist of a horizontal vessel to which heat may be supplied by a gas burner or other suitable means in accordance with known practice. A dome or vertically extending pipe 11 is connected to the upper side of the main boiler vessel so that the refrigerant vapor generated therein may pass upwardly through this dome and from there into the condenser C through the conduit 12, a portion of which may be provided with heat radiating fins 13 and act as a rectifier.

As the refrigerant is cooled and liquefied in the condenser, it is fed into the evaporator E through the conduit 14. The evaporator may consist of a vertically disposed vessel having baffle plates therein, in accordance with known construction. As the refrigerant trickles downwardly over the baffle plates it evaporates into the inert gas in the evaporator to produce a cooling effect.

The top of the evaporator is connected to the bottom of the absorber by means of an inert gas conduit 15 while the top of the absorber is connected to the bottom of the evaporator by means of the inert gas conduit 16. These inert gas conduits may be in heat exchange relation as illustrated. They provide means for circulating the inert gas between the evaporator and the absorber and for conveying refrigerant gas from the evaporator to the absorber. The inert gas circuit may be caused to circulate in either direction depending upon the structure of a fan (not shown) which may be located in the absorber.

In the absorber the inert gas together with the refrigerant gas carried with it from the evaporator comes in contact with absorption liquid. The absorption liquid is circulated between the absorber and the boiler by means of liquid conduits 17 and 18, the conduit 17 connecting the bottom of the absorber to the boiler and the conduit 18 connecting the upper portion thereof to the boiler. The conduits 17 and 18 are preferably in heat exchange relation as illustrated.

Located within the absorber are a number of baffle plates 19 along the lower side thereof which cause the formation of pools of liquid thereon. Extending longitudinally through the absorber is a shaft 20 which is adapted to be driven by the hermetically sealed electric motor 21 and which is mounted in suitable bearings one of which is shown at 22 in the lower end or head piece 23 which together with the cylindrical portion 24 forms a closed vesse'.

The shaft 20 carries a number of obliquely inclined discs or wobble plates 25, there being as many wobble plates as there are baffle plates 19 secured on the inside of the vessel 24. Each disc or wobble plate 25 may be circular in shape and approximately two and a half inches in diameter. The wobble plates may be mounted at an angle of about 73 degrees with the shaft with their centers centrally disposed between the baffle plates 19 along the lower edge of the absorber. The absorber vessel itself may be inclined at an angle of about 20 degrees from the horizontal and the baffle plates 19 may be spaced about an inch apart.

The wobble plates 25 may be secured to the shaft 20 in any suitable way as by means of the set screw 26 or they may be welded or otherwise secured to the shaft.

In the arrangement as shown in Figure 2, none of the wobble plates 25 is shown contacting the liquid. It will be apparent, however, that as the discs and the shaft rotate 180 degrees, the portions of the discs shown at the right of the shaft in Figure 2 will dip into the liquid. As these discs are further rotated the liquid will be thrown from one pool up to the pool above the next upper baffle plate 19. At the same time a large quantity of liquid will be splashed about the interior of the absorber vessel by the wobble plates and this will aid in transferring heat to the cooling means for the absorber such as the heat radiating fin on the outside thereof.

It will be apparent that absorption liquid may thus be caused to flow upwardly through the absorber from pool to pool. The liquid thus flows upwardly from the lower end thereof near the point of entrance of the supply conduit 17 until it leaves the absorber through the conduit 18 which acts as an outlet and which is connected to the upper end thereof. The absorption liquid then may flow by gravity back to the boiler and back to the lower portion of the absorber. The liquid may be lifted any desired height in the absorber, depending upon the number of wobble plates used.

In the arrangement shown the discs 25 have little effect upon the circulation of gases through the absorber but they do act similar to a conventional centrifugal fan and in reality can be considered to be a streamline one-bladed fan. The discs could be used to discharge gases axially in one direction only and thus they could be used to circulate gas through the absorber. On the other hand the inert gas may be circulated by separate means or by a fan (not shown) on the shaft 20.

The system may be charged with ammonia, water and nitrogen as refrigerant, absorbent and inert gas, in accordance with known practice.

While only one embodiment of the invention has been shown and described herein, it is obvious that various changes may be made without departing from the scope of the annexed claims.

I claim:

1. An absorber adapted for use in a continuous absorption refrigerating system using inert gas, said absorber comprising a closed vessel, means for supplying and removing inert gas to said vessel, means for supplying absorption liquid to said vessel, means for removing absorption liquid from said vessel, means for forming pools of liquid in said vessel, a shaft mounted within said vessel, power means for driving said shaft and discs mounted upon the shaft for rotation therewith, said discs being so mounted as to intermittently dip into the liquid in said pools and to splash the same about the interior of said vessel in contact with the inert gas and to impart intermittent bodily movements to substantially the entire body of liquid in each of said pools.

2. A combined absorber and liquid pump, adapted for use in a continuous absorption refrigerating system, and comprising a closed cylindrical vessel disposed in an inclined position, a shaft mounted for rotation in said vessel and extending longitudinally thereof, means for rotating said shaft, means for forming pools of liquid along the lower side of said vessel and means carried by the shaft for intermittently dipping into said pools and for throwing liquid from one pool to the next higher pool, said last mentioned means comprising a series of wobble plates or discs mounted on the shaft at other than right angles to the axis thereof.

3. An absorber adapted for use in a continuous absorption refrigeration system using inert gas, said absorber comprising a closed vessel, means for supplying and removing inert gas to and from said vessel, means for supplying absorption liquid to said vessel, means for removing absorption liquid from said vessel, means forming pools of liquid in said vessel, and power-driven means including means constructed and arranged to pass through said pools intermittently lengthwise thereof to stir the pools bodily and to spray a portion of the liquid contained in each pool into an adjacent pool.

4. Absorption refrigerating apparatus comprising a boiler, an evaporator, means for supplying refrigerant vapor generated in said boiler to said evaporator in liquid phase, an absorber, means for conveying refrigerant vapor from said evaporator to said absorber, means forming a solution circuit including said absorber and said boiler, said apparatus being characterized by the fact that said absorber comprises a closed inclined vessel, means for forming pools of liquid in said vessel, a shaft mounted within said vessel, means for driving said shaft, and discs mounted upon the shaft for rotation therewith, said discs being mounted at an angle other than a right angle to the axis of said shaft.

5. Absorption refrigerating apparatus comprising a boiler, an evaporator, means for supplying refrigerant vapor generated in said boiler to said evaporator in liquid phases, an absorber, means for conveying refrigerant vapor from said evaporator to said absorber, means forming a solution circuit including said absorber and said boiler, said apparatus being characterized by the fact that said absorber comprises an inclined vessel, means within said vessel forming a plurality of pools of liquid, a wobble plate mounted to dip into each pool, power driven means for actuating said wobble plates, and means for air cooling said absorber.

6. Absorption refrigerating apparatus including an absorber vessel, means for conducting absorption solution to and from said vessel, means for conducting refrigerant to be absorbed to said vessel, means within said vessel constructed and arranged to form a plurality of pools of solution at successively higher levels, and means mounted in said vessel for intermittently sweeping through the solution in said pools to impart a surging movement to substantially the entire body of liquid in each of said pools and for splashing the solution about the interior of said vessel and for transferring a portion of the solution in each pool to a higher pool.

ARNOLD D. SIEDLE.